United States Patent
Yamashita et al.

(10) Patent No.: US 10,124,824 B2
(45) Date of Patent: Nov. 13, 2018

(54) STEERING APPARATUS

(71) Applicants: TOYOTA JIDOSHA KABUSHIKI KAISHA, Toyota-shi, Aichi-ken (JP); JTEKT Corporation, Osaka-shi, Osaka (JP)

(72) Inventors: Masaharu Yamashita, Toyota (JP); Hideya Kato, Okazaki (JP); Akihisa Umetani, Okazaki (JP); Masayuki Tsukagoshi, Okazaki (JP)

(73) Assignees: TOYOTA JIDOSHA KABUSHIKI KAISHA, Toyota-shi, Aichi-ken (JP); JTEKT Corporation, Osaka-shi, Osaka (JP)

( * ) Notice: Subject to any disclaimer, the term of this patent is extended or adjusted under 35 U.S.C. 154(b) by 26 days.

(21) Appl. No.: 15/409,043

(22) Filed: Jan. 18, 2017

(65) Prior Publication Data
US 2017/0203783 A1 Jul. 20, 2017

(30) Foreign Application Priority Data
Jan. 19, 2016 (JP) .................................. 2016-007983

(51) Int. Cl.
*B62D 3/12* (2006.01)
*B62D 5/04* (2006.01)
*B62D 6/10* (2006.01)

(52) U.S. Cl.
CPC .............. *B62D 5/0403* (2013.01); *B62D 3/12* (2013.01); *B62D 5/0448* (2013.01); *B62D 5/0463* (2013.01); *B62D 6/10* (2013.01)

(58) Field of Classification Search
CPC ...... B62D 5/0403; B62D 3/12; B62D 5/0448; B62D 5/0463
See application file for complete search history.

(56) References Cited

U.S. PATENT DOCUMENTS

| | | | |
|---|---|---|---|
| 4,415,054 A * | 11/1983 | Drutchas | B62D 5/0427 180/444 |
| 4,742,882 A * | 5/1988 | Shimizu | B62D 5/0424 180/444 |
| 4,766,970 A * | 8/1988 | Shimizu | B62D 5/0427 180/444 |

(Continued)

FOREIGN PATENT DOCUMENTS

| | | |
|---|---|---|
| JP | 2006-256528 A | 9/2006 |
| JP | 2012-017094 A | 1/2012 |
| JP | 2014-234102 A | 12/2014 |

*Primary Examiner* — Joseph M Rocca
*Assistant Examiner* — Michael R Stabley
(74) *Attorney, Agent, or Firm* — Sughrue Mion, PLLC

(57) ABSTRACT

The steering apparatus includes a first seal member and a second seal member. The first seal member is fixed to one of an outer peripheral surface of a rack shaft and an inner peripheral surface of a housing. The first seal member slidably contacts with a cylindrical surface which is centered on the axis and is provided on the other of the outer peripheral surface of the rack shaft and the inner peripheral surface of the housing. The second seal member is fixed to the other of the outer peripheral surface and the inner peripheral surface. The second seal member slidably contacts with a cylindrical surface which is centered on the axis and is provided on the one of the outer peripheral surface of the rack shaft and the inner peripheral surface of the housing.

4 Claims, 5 Drawing Sheets

(56) References Cited

U.S. PATENT DOCUMENTS

| | | | | |
|---|---|---|---|---|
| 4,834,202 A | * | 5/1989 | Shimizu | B62D 5/0406 180/444 |
| 2007/0089926 A1 | * | 4/2007 | Jo | B62D 5/04 180/443 |
| 2011/0303480 A1 | | 12/2011 | Shimizu et al. | |

* cited by examiner

PRIOR ART

STEERING APPARATUS

BACKGROUND OF THE INVENTION

1. Field of the Invention

The present invention relates to a steering apparatus which performs steering assist by using a driving force of an electric motor.

2. Description of the Related Art

FIG. 7 is an example of a steering apparatus provided in a vehicle.

The steering apparatus includes a cylindrical housing which is fixed to the front portion of the bottom of a vehicle body. The housing extends in a lateral direction, which is a width direction of the vehicle body, and the both ends thereof are opened.

A rack shaft is inserted into the housing so that the rack shaft is movable in the lateral direction and is not rotatable about its own axis. The left and right ends of the rack shaft are connected to left and right front wheels via tie rods, respectively. A screw groove and a rack tooth portion are formed on two parts of the outer peripheral surface of the rack shaft respectively so that the screw groove and the rack tooth portion are at positions different from each other.

Furthermore, the steering apparatus is provided with a pinion shaft, which is meshed with the rack tooth portion of the rack shaft, and a steering shaft (not shown), which is connected to the pinion shaft at the lower end thereof and is fixed to a steering wheel (not shown) at the upper end thereof.

Moreover, a rotary nut of a well-known ball screw nut is rotatably supported by the inner peripheral surface of the housing via a bearing (not shown).

In addition, an electric motor (not shown) provided in the housing is connected to the rotary nut. When the electric motor is driven, the rotary nut is rotated with respect to the housing, and a plurality of balls, which are components of the ball screw nut, circulate through a passage provided in the screw groove of the rack shaft and the rotary nut. Therefore, the rack shaft slides in the lateral direction with respect to the housing.

When a driver rotates the steering wheel, the steering shaft and the pinion shaft rotate together with steering wheel. Then, the rack shaft meshed with the pinion shaft relatively slides with respect to the housing in one of the lateral direction, and thereby steering angles of the left and right front wheels are changed.

Further, when the driver rotates the steering wheel, a steering torque generated in the steering shaft is detected by a steering torque sensor. Then, a control device (calculator) calculates a target steering assist torque corresponding to the steering torque, and operates the electric motor so as to generate the target steering assist torque. As a result, the driving force of the electric motor is transmitted to the rotary nut, thereby the rotary nut rotates. In this case a direction of rotation of the rotary nut is a direction to slide the rack shaft in the one of the lateral direction. In other words, rotative force (torque) of the nut becomes a force to assist the sliding motion of the rack shaft along with the steering operation.

By the way, grease for operating the ball screw nut smoothly is applied to the ball screw nut.

If water entering the housing from the outside of the housing comes into contact with the grease, the grease applied to the ball screw nut is washed away by the water. If the grease is washed away, motion of the ball screw nut becomes unsmooth, and/or durability of the ball screw nut decreases.

Therefore, in recent years, there is a need to prevent water from washing away grease applied to the ball screw nut by a seal member.

Therefore, in the steering apparatus of FIG. 7, a first seal member and a second seal member, both of which are constituted by elastic material and have an annular shape coaxial with the rack shaft and the housing, are fixed to two portions of the inner peripheral surface of the housing, respectively. The first seal member is in sliding contact with a first outer peripheral portion, which is a cylindrical surface located between the screw groove and the rack tooth portion of the rack shaft, in a water tight manner. On the other hand, the second seal member is in sliding contact with a second outer peripheral portion, which is a cylindrical surface located on a side opposite to the rack tooth portion with respect to the screw groove of the rack shaft, in a water tight manner.

When a torque of the pinion shaft and/or a torque of the electric motor are transmitted to the rack shaft so that the rack shaft moves in the lateral direction with respect to the housing, the first seal member and the second seal member are in sliding contact with the first outer peripheral portion and the second outer peripheral portion of the rack shaft, respectively. Regardless of relative position of the rack shaft with respect to the housing in the lateral direction, the first seal member and the second seal member are in contact with the first outer peripheral portion and the second outer peripheral portion of the rack shaft, respectively.

Therefore, even when water enters the housing through both opening ends of the housing, there is a low possibility that the water passes through a space between seal members (the first seal member and the second seal member) and the outer peripheral surface of the rack shaft, and the water washes away grease applied to the ball screw nut.

It should be noted that Japanese Unexamined Patent Application Publication No. 2006-256528 discloses a background technology related to the present invention.

SUMMARY OF THE INVENTION

If there are irregularities on a portion (the first outer peripheral portion and the second outer peripheral portion) of the rack shaft, with which the first seal member and the second seal member come into contact respectively, there is a fear that a gap is formed between seal members (the first seal member and the second seal member) and the rack shaft, and water passes through the gap and heads to the ball screw nut. Therefore, the first seal member and the second seal member need to be come in contact with a cylindrical surface (having no irregularity) of the rack shaft.

Further, a contact position of the first outer peripheral portion with respect to the first seal member and a contact position of the second outer peripheral portion with respect to the second seal member are changed in the lateral direction along with the movement of the rack shaft in the lateral direction. Therefore, the first outer peripheral portion and the second outer peripheral portion have to have a length in the lateral direction, which is equal to or larger than a distance between left and right movement limit positions of the rack shaft (slidable distance).

However, the rack tooth portion engaged with the pinion shaft and the screw groove connected to the electric motor are respectively formed on the rack shaft of the steering apparatus of FIG. 7. Furthermore, the entire length (length in the lateral direction) of the rack shaft is limited by the vehicle width of the vehicle in which the steering apparatus is installed.

When the rack tooth portion, the screw groove, the first outer peripheral portion, and the second outer peripheral portion are formed on the outer peripheral surface of the rack shaft, which is installed in a vehicle narrow in a vehicle width, such that the first outer peripheral portion and the second outer peripheral portion are arranged at positions different from those of the rack tooth portion and the screw groove, respectively, the rack tooth portion, the screw groove, the first outer peripheral portion, and the second outer peripheral portion have to be formed so as to have short length in the lateral direction, respectively. In other words, it is necessary to shorten the slidable distance of the rack shaft by shortening the lateral lengths of the rack tooth portion and the screw groove. Furthermore, in accordance with this design change, it is necessary to shorten the lateral lengths of the first outer peripheral portion and the second outer peripheral portion.

However, if shortening the lateral lengths of the rack tooth portion and the screw groove, the maximum steering angles of the front wheels are reduced, and thereby turning performance of the vehicle is deteriorated.

In addition, when the maximum steering angles of the front wheels are designed to be large in the case where the vehicle width of the vehicle, to which the rack shaft is installed, is short, the lateral lengths of the rack tooth portion and the screw groove become large despite the entire length of the rack shaft is short. Therefore, the lateral lengths of the first outer peripheral portion and the second outer peripheral portion are shorter than the slidable distance of the rack shaft.

In this case, when the rack shaft slides, the first seal member and the second seal member are come into contact with the rack tooth portion and the screw groove, both of which have irregularities. Therefore, in this case, there is a fear that water heads to the ball screw nut after the water passes through a gap formed between seal members (the first seal member and the second seal member) and the rack shaft, and thereby grease applied to the ball screw nut is washed away by the water.

The present invention has been made to cope with the above problems. Namely, the present invention has an object to provide a steering apparatus in which water can be prevented from coming into contact with a ball screw nut provided inside a housing even when the entire length of a rack shaft is short and the maximum steering angle of a wheel is set to be large.

In order to achieve the object, a steering apparatus of the present invention comprises:

a cylindrical housing (21) extending in a lateral direction which is a vehicle body (11) width direction;

a rack shaft (30) inserted into the housing so as not to be rotatable about an axis thereof, the rack shaft changing a steering angle of a wheel (15L, 15R) by sliding in the axial direction, the rack shaft provided at two positions different from each other in the axial direction with a rack tooth portion (32) and a screw groove (36) respectively;

a pinion shaft (50) sliding the rack shaft by transmitting a torque of a steering wheel (53) to the rack tooth portion;

a ball screw nut (40), provided inside the housing, for sliding the rack shaft by transmitting a torque of an electric motor (44) to the screw groove;

a first seal member (45) fixed to one of an outer peripheral surface of the rack shaft and an inner peripheral surface of the housing so as to be positioned on the rack tooth portion side with respect to the screw groove, the first seal member slidably contacting with a cylindrical surface (26, 33) which is centered on the axis and is provided on the other of the outer peripheral surface of the rack shaft and the inner peripheral surface of the housing; and a second seal member (47) fixed to the other of the outer peripheral surface of the rack shaft and the inner peripheral surface of the housing so as to be positioned on a side opposite to the rack tooth portion with respect to the screw groove, the second seal member slidably contacting with a cylindrical surface (27, 37) which is centered on the axis and is provided on the one of the outer peripheral surface of the rack shaft and the inner peripheral surface of the housing.

In the steering apparatus of the present invention, one of the two seal members (the first seal member, the second seal member), which seal between the housing and the rack shaft, is fixed to the outer peripheral surface of the rack shaft, while the other of the two seal members is fixed to the inner peripheral surface of the housing. Therefore, along with movement of the rack shaft in the axial direction thereof, the one of the two seal members slides on the cylindrical surface formed on the inner peripheral surface of the housing, while the other of the two seal members slides on the cylindrical surface formed on the outer peripheral surface of the rack shaft.

In this way, only the sliding surface, on which the other of the two seal members slides, is formed on the rack shaft, while the sliding surface, on which the one of the two seal members slides, is formed on the housing. In other words, only the rack tooth portion, the screw groove and the cylindrical surface on which the other of the two seal members slide are formed on the outer peripheral surfaces of the rack shaft, and the cylindrical surface, on which the one of the two seal member slides, is not formed on the outer peripheral surface of the rack shaft.

Therefore, even when the entire length of the rack shaft is short, the rack tooth portion, the screw groove and the cylindrical surface on which the other of the two seal members slide can be formed on the rack shaft with an entire length of each of the rack tooth portion, the screw groove and the cylindrical surface being long.

Therefore, water coming into the housing from the both ends thereof can be prevented from coming into contact with the ball screw nut provided inside the housing even when the entire length of the rack shaft is short and the maximum steering angle of the wheel is set to be large.

In one of aspects of the present invention, the first seal member is fixed to a first outer peripheral portion (33) which is formed on the outer peripheral surface of the rack shaft so as to be at a position between the rack tooth portion and the screw groove, and slidably contacts with a first inner peripheral portion (26) which is the cylindrical surface of the housing.

The second seal member is fixed to a second inner peripheral portion (27) which is formed on the inner peripheral surface of the housing so as to be at a position different from the first inner peripheral portion, and slidably contacts with a second outer peripheral portion (37) which is the cylindrical surface formed on the outer peripheral surface of the rack shaft so as to be positioned on a side opposite to the rack tooth portion with respect to the screw groove.

When the second seal member is fixed to the second outer peripheral portion of the rack shaft with the maximum steering angle of the wheel set to be large, the second inner peripheral portion of the housing, with which the second seal member comes into contact, needs to be formed so as to be long, and thereby the entire length of the housing must be long. However, in general, in a vehicle a variety of members are provided around the housing, interference between these members and the housing must be avoided. Thus, the second inner peripheral portion may be formed so as to be short in order to shorten the entire length of the housing. However, in this case, if the maximum steering angle of the wheel is set to be large, there is a fear that the second seal member comes into contact with a portion of the housing, which is different from the second inner peripheral portion, when the steering angle of the wheel is at the maximum steering angle. Namely, when the steering angle of the wheel is at the maximum steering angle, there is a fear that the second seal member does not contact with the second inner peripheral portion of the housing, and thereby water comes into contact with the ball screw nut.

When the present invention is configured as described above, however, the second inner peripheral portion, to which the second seal member is fixed, does not needs to be formed so as to be long even when the maximum steering angle of the wheel is set to be large. Therefore, even when the entire length of the housing is short and the maximum steering angle of the wheel is set to be large, it is possible to bring the second seal member into contact with the second outer peripheral portion of the rack shaft at all time. Therefore, water can be prevented from coming into contact with the ball screw nut when the steering angle of the wheel is at the maximum steering angle.

In one of aspects of the present invention, the rack shaft is provided with a large diameter portion (35), on which the screw groove is formed, and a small diameter portion (31), which has the first outer peripheral portion and a diameter smaller than that of the large diameter portion.

An outer diameter of the first seal member is larger than that of the large diameter portion.

When a relative position of the rack shaft with respect to the housing is a predetermined position, the large diameter portion faces with the first inner peripheral portion from inner peripheral side of the housing.

In the case where the first seal member is fixed to the first outer peripheral portion and the second seal member is fixed to the second inner peripheral portion, a volume (size) V1 of an annular space formed between a portion of the first inner peripheral portion, which is positioned on the second seal member side with respect to the first seal member, and the rack shaft is changed depending on the relative position of the rack shaft with respect to the housing. On the other hand, a volume (size) V0 of an annular space formed between a portion of the housing, which is positioned on the second seal member side with respect to the first inner peripheral portion, and the rack shaft is not changed even when the relative position of the rack shaft with respect to the housing changes.

If an amount of change $\varDelta$V1 of volume V1 along with the sliding motion of the rack shaft is large, a change ratio of the volume of an annular space, which is formed between the housing and the rack shaft and is positioned between the first seal member and the second seal member (hereinafter, it is referred to as space between seal members.), becomes large. In other words, a change ratio of air pressure in the space between seal members becomes large.

If the air pressure in the space between seal members sharply decreases when the rack shaft slides, air and/or water outside of the first seal member and the second seal member are easily sucked into the space between seal members via a space between the first seal member and the first inner peripheral portion and a space between the second seal member and the second outer peripheral portion.

When the present invention is configured as described above, however, the volume V1 becomes smaller compared with the case where the outer diameter of a portion of the rack shaft, on which the screw groove is formed, is equal to or less than that of a portion of the rack shaft, on which the first outer peripheral portion is formed. Therefore, the amount of change $\varDelta$V1 of volume V1 along with the sliding motion of the rack shaft becomes also small. Therefore, change ratio of air pressure in the space between seal members becomes small when the rack shaft slides. Therefore, when the rack shaft slides in a direction in which the air pressure of the space between seal members is decreased, there is a low possibility that air and/or water outside of the first seal member and the second seal member are sucked into the space between seal members via a space between the first seal member and the first inner peripheral portion and a space between the second seal member and the second outer peripheral portion.

In one of aspects of the present invention, a portion of the housing is constituted by a large diameter cylindrical portion (22), which is positioned between the first seal member and the second seal member and has a diameter larger than that of a portion adjacent to the large diameter cylindrical portion.

In this case, the volume V0 becomes large. Therefore, change ratio of the volume of the space between seal members along with the sliding motion of the rack shaft becomes small, and thereby change ratio of air pressure in the space between seal members becomes small.

Therefore, when the rack shaft slides in a direction in which the air pressure of the space between seal members is decreased, the fear that air and/or water outside of the first seal member and the second seal member are sucked into the space between seal members via a space between the first seal member and the first outer peripheral portion and a space between the second seal member and the second inner peripheral portion becomes smaller.

In one of aspects of the present invention, the ball screw nut is provided inside the large diameter cylindrical portion.

It is necessary to make the housing have a large diameter in order to install the ball screw nut in the housing. On the other hand, when making the outer diameter of the entire housing large, freedom of a layout of the members provided around the housing is restricted.

However, when the present invention is configured in this manner, it is possible to install the ball screw to nut in the housing while suppressing restriction to freedom of a layout of the members provided around the housing.

In the above description, references used in the following descriptions regarding embodiments are added with parentheses to the elements of the present invention, in order to understand the invention. However, those references should not be used to limit the scope of the present invention.

Other objects, other features, and accompanying advantages of the present invention are easily understood from the description of embodiments of the present invention to be given referring to the following drawings.

DETAILED DESCRIPTION OF THE PREFERRED EMBODIMENTS

Figure 1:
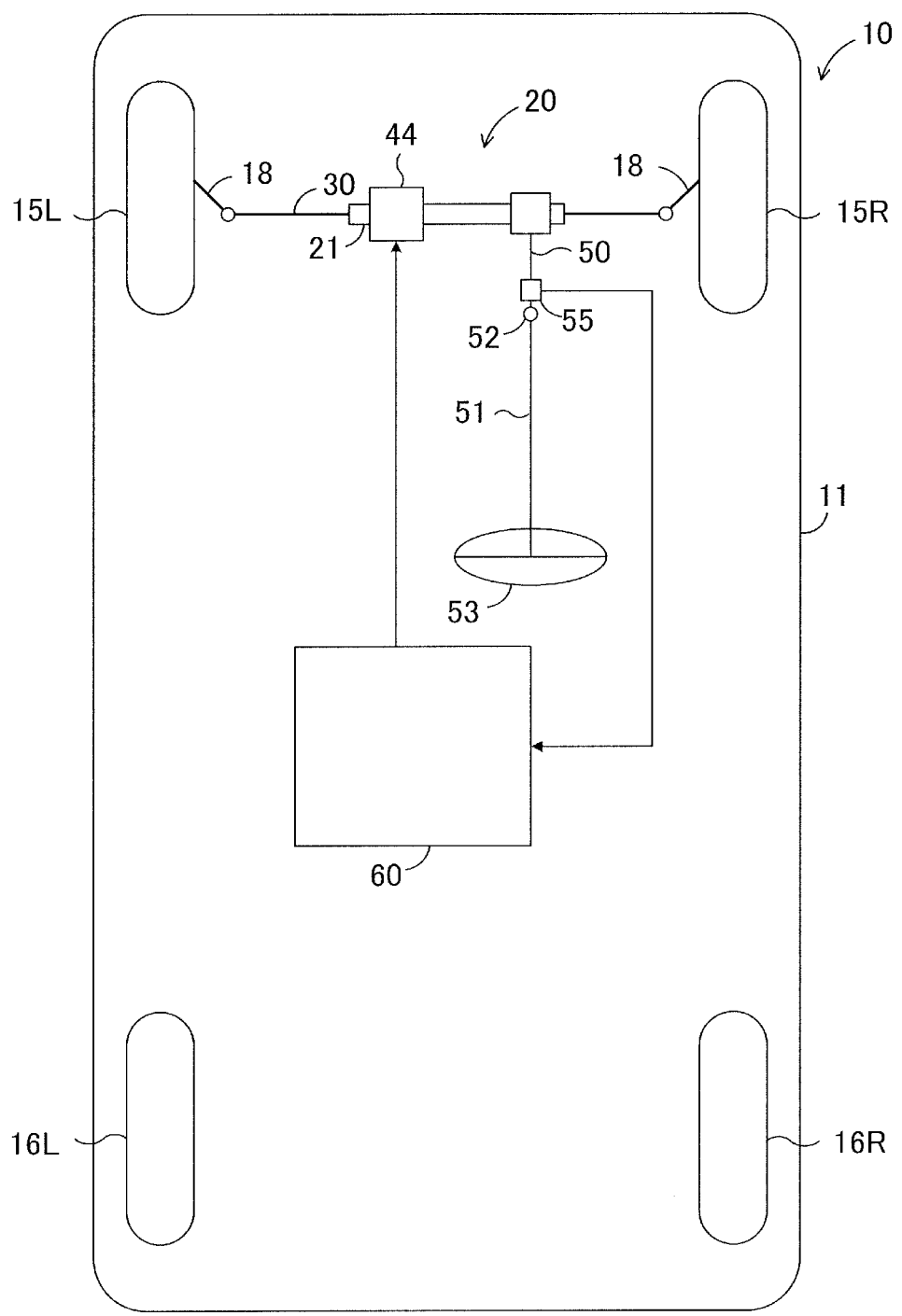
FIG. 1 is a schematic plan view of the whole vehicle having a steering apparatus according to an embodiment of the present invention.

A steering apparatus according to an embodiment of the present invention will be described hereinafter with reference to the accompanying drawings.

First, the overall structure of a vehicle 10 having the steering apparatus will be briefly described with reference to FIG. 1.

A vehicle body 11 of the vehicle 10 is provided in a front portion thereof with a suspension (not shown).

As is well known, the suspension is provide, as main components, with a suspension member, an upper arm, a lower arm, a carrier, a coil spring, and a shock absorber.

A left carrier (knuckle arm) is supported by distal end portions of the left upper arm and the left lower arm, while a right carrier is supported by distal end portions of the right upper arm and the right lower arm. Each of the carriers can rotate about a king pin shaft. The left and right carriers support a front wheel 15L and a front wheel 15R respectively so that the front wheel 15L and the front wheel 15R can rotate about a horizontal axis.

The vehicle body 11 of the vehicle 10 is also provided in a rear portion thereof with a suspension (not shown). This suspension supports a left rear wheel 16L and a right rear wheel 16R respectively so that the rear wheel 16L and the rear wheel 16R can rotate about a horizontal axis.

Next, detailed structure of a steering apparatus 20 will be described with reference to the accompanying drawings.

A cylindrical housing 21 extending in the vehicle body 11 width direction, that is, a lateral direction, is fixed to the upper surface of the suspension member.

As shown in FIGS., the substantially central portion of the housing 21 in the longitudinal direction is constituted by a substantially cylindrical large diameter cylindrical portion 22 which has the largest inner diameter in the housing 21. A left side portion 23 of the housing 21 is constituted by a cylindrical portion smaller in diameter than that of the large diameter cylindrical portion 22. A right end portion 24 of the housing 21 is constituted by a cylindrical portion whose diameter is smaller than that of the large diameter cylindrical portion 22 and is larger than that of the left side portion 23. A right side portion 25 constituting a portion between the right end portion 24 and the large diameter cylindrical portion 22 of the housing 21 is constituted by a cylindrical portion, which is coaxial with the large diameter cylindrical portion 22 and the left side portion 23 and is smaller in diameter than that of the left side portion 23. Furthermore, the inner peripheral surface of the right side portion 25 is a first inner peripheral portion 26, which is a cylindrical surface centered on the axis of the housing 21 (namely, it has no irregularity.). The inner peripheral surface of the left side portion 23 is a second inner peripheral portion 27, which is a cylindrical surface centered on the axis of the housing 21 (namely, it has no irregularity.).

A rack shaft 30, which is a rod member extending in the lateral direction, is coaxially inserted into housing 21. The rack shaft 30 can slide with respect to the housing 21 in the lateral direction and is not rotatable about its own axis. Left and right end portions of the rack shaft 30 pass through left and right end openings of the housing 21, and are positioned on the outsides of left and right ends of the housing 21, respectively.

The rack shaft 30 is provided with a small diameter portion 31 and a large diameter portion 35, which is coaxial with the small diameter portion 31 and extends to the left from the small diameter portion 31.

A portion excluding the left and right ends of the small diameter portion 31 has a cross-sectional shape, which is obtained by cutting a part of a cylinder by a plane. This portion has a surface cut by the plane, and a rack tooth portion 32 is formed on this surface. Left and right end portions of the small diameter portion 31 are cylindrical shapes, which are coaxially with each other and have the same diameter. The outer peripheral surface of the left end portion of the small diameter portion 31 is constituted by a first outer peripheral portion 33, which is a cylindrical surface (which has no irregularity) centered on the axis of the rack shaft 30.

The large diameter portion 35 has a cylindrical shape, which is coaxial with the small diameter portion 31. The outer diameter of the large diameter portion 35 is larger than that of the small diameter portion 31 and is slightly smaller than the inner diameter of the right side portion 25. A screw groove 36, which is a spiral shape, is formed on the outer peripheral surface of the large diameter portion 35. In addition, the outer peripheral surface of a portion of the large diameter portion 35, which is positioned on the left side with respect to the screw groove 36, is constituted by a second outer peripheral portion 37. The second outer peripheral portion 37 is a cylindrical surface (having no irregularity), which is centered on the axis of the rack shaft 30.

As shown in FIG. 1, the left and right ends of the rack shaft 30 are connected to the inner ends of left and right pair of the tie rods 18. The outer ends of the left and right tie rods 18 are connected to the left and right carriers, respectively.

Figure 2:
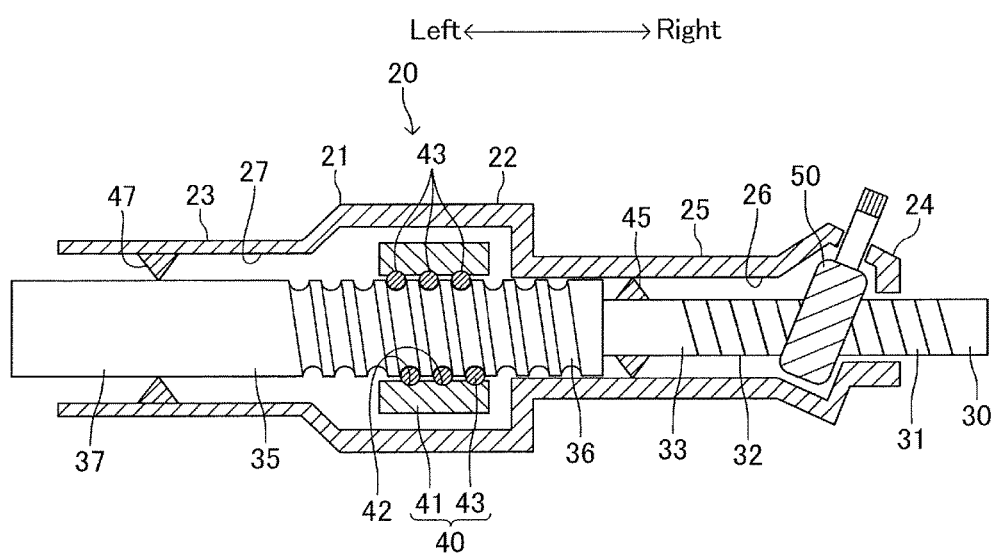
FIG. 2 is a longitudinal sectional view of the steering apparatus taken along a plane which is located on the axis of a pinion shaft.

Furthermore, as shown in FIG. 2, a rotary nut 41, which is located on the outer peripheral side of the screw groove 36, is installed inside the large diameter cylindrical portion 22 of the housing 21. The rotary nut 41 is a cylindrical member which is coaxial with the rack shaft 30. A screw groove 42 having a spiral shape is formed on the inner peripheral surface of the rotary nut 41.

Furthermore, a driven pulley (not shown), which is positioned on the outer peripheral side of the rotary nut 41, is provided inside the housing 21. This driven pulley is a cylindrical body coaxial with the rotary nut 41, and the inner peripheral surface of the driven pulley is fixed to the outer peripheral surface of the rotary nut 41. A tooth portion is formed on a part of the outer peripheral surface of the driven pulley.

A portion of the outer peripheral surface of the driven pulley, which is different from the tooth portion, is supported by the inner peripheral surface of the large diameter cylindrical portion 22 via a bearing (not shown) so that the driven pulley is rotatable and is not slidable in the lateral direction. Therefore, the rotary nut 41 and the driven pulley are relatively rotatable with respect to the housing 21 about the axis of the rack shaft 30.

Furthermore, a plurality of balls 43 are rotatably inserted into a spiral passage which is formed between the screw groove 36 of the rack shaft 30 and the screw groove 42 of the rotary nut 41.

Illustration is omitted, however, a passage is formed inside the rotary nut 41. This passage is communicated with the both ends of the screw groove 42. The balls 43 are movable in this passage. That is, an annular passage is constituted by the spiral passage which is formed between the screw groove 36 and the screw groove 42 and the passage formed inside the rotary nut 41. Therefore, when the rotary nut 41 rotates relative to the rack shaft 30, each of the balls 43 circulates in this annular passage while rotating.

In this way, the rotary nut 41 and the balls 43 constitute a well-known ball screw nut 40, which is linked with the rack shaft 30. Therefore, when the rotary nut 41 rotates relative to the rack shaft 30, the rack shaft 30 moves in the lateral direction with respect to the housing 21 and the rotary nut 41 while circulating the balls 43 in the annular passage.

Furthermore, grease (not shown) for facilitating rotation of the ball screw nut 40 is applied to the ball screw nut 40.

A first support member (not shown) is fixed to the outer peripheral surface of the large diameter cylindrical portion 22 of the housing 21. An electric motor 44 (see FIG. 1) is fixed to the first support member. Furthermore, a waterproof cover (not shown) covering the electric motor 44 is mounted on the first support member. The electric motor 44 includes a rotary output shaft (not shown) projecting from the body portion of the electric motor 44. A driving pulley (not shown) is coaxially fixed to the rotary output shaft. Furthermore, as shown in FIG. 1, the electric motor 44 is connected to the control device 60.

A first through-hole (not shown) is formed in the large diameter cylindrical portion 22 of the housing 21.

A belt (not shown) is stretched around (wound around) the driving pulley of the electric motor 44 and the driven pulley. The belt has an annular shape and is provided on the inner peripheral surface thereof with a tooth portion. The tooth portion of the belt is meshed with the driving pulley and driven pulley. A portion of this belt is positioned inside the housing 21 through the first through-hole, and is meshed with the driven pulley in the housing 21.

When the driving pulley of the electric motor 44 rotates, a torque (rotative force) of the driving pulley is transmitted to the driven pulley via the belt, and thereby the driven pulley and the rotary nut 41 are rotated at a speed slower than the rotational output shaft.

Figure 3:
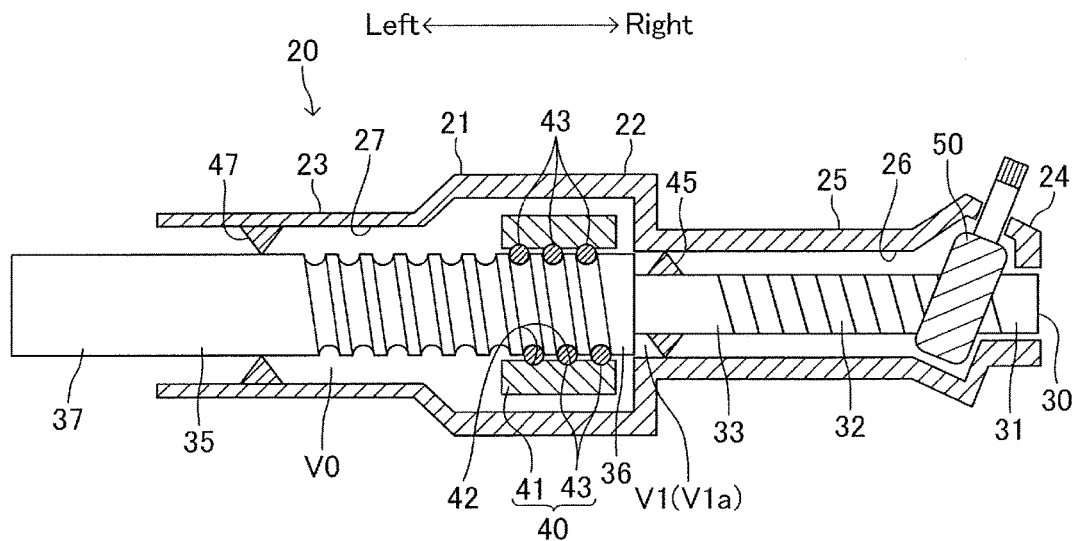
FIG. 3 is a longitudinal sectional view similar to that of FIG. 2 when a rack shaft moves at the left side movement limit position.
Figure 4:
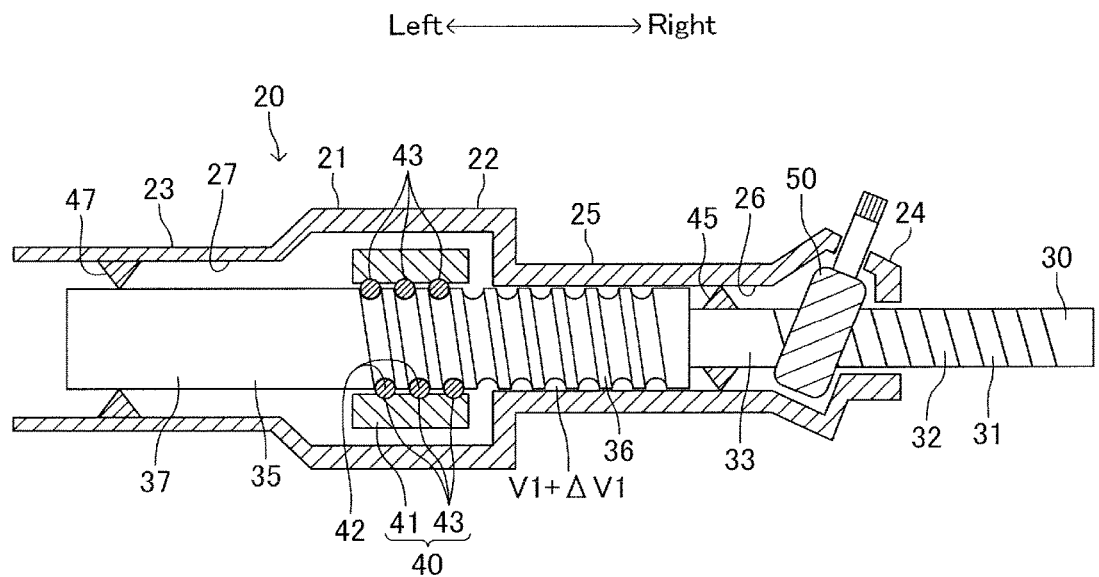
FIG. 4 is a longitudinal sectional view similar to that of FIG. 2 when the rack shaft moves at the right side movement limit position.

A first seal member 45, which is an annular body coaxial with the rack shaft 30 and is formed by elastic material, is fixed to the outer peripheral surface of the first outer peripheral portion 33 of the rack shaft 30. As shown in FIGS. 2 to 4, the outer diameter of the first seal member 45 is larger than that of the large diameter portion 35. Additionally, the outer peripheral portion of the first seal member 45 is in contact with the first inner peripheral portion 26 of the housing 21 in a water-tight manner while being slightly elastically deformed. Furthermore, the first seal member 45 is slidable on the first inner peripheral portion 26.

On the other hand, a second seal member 47, which is an annular body coaxial with the housing 21 and is formed by elastic material, is fixed to the second inner peripheral portion 27 of the housing 21. As shown in FIGS. 2 to 4, the inner peripheral portion of the second seal member 47 is in contact with the second outer peripheral portion 37 of the rack shaft 30 in a water-tight manner while being slightly elastically deformed. Furthermore, the second seal member 47 is slidable on the second outer peripheral portion 37.

A second through-hole (not shown) is formed in the right end portion 24 of the housing 21. A pinion shaft 50 is inserted into the housing 21 via the second through-hole. The pinion shaft 50 is supported by the housing 21 so as not to be movable in the axial direction thereof. The pinion shaft 50 is rotatable about its own axis, and is meshed with the rack tooth portion 32 of the rack shaft 30 in the housing 21.

As shown in FIG. 1, one end (lower end) of a steering shaft 51, which is a rod member, is connected to the pinion shaft 50 via a universal joint 52. Furthermore, a steering wheel 53 is fixed to the other end (upper end) of the steering shaft 51.

Therefore, when a driver riding in the vehicle 10 rotates the steering wheel 53, the torque (rotative force) of the steering wheel 53 is transmitted to the pinion shaft 50 via the steering shaft 51 and the universal joint 52, and thereby the pinion shaft 50 is rotated around its own axis. Then, since the rack shaft 30, which is meshed with the pinion shaft 50, slides in the lateral direction with respect to the housing 21, a steering angle of each of the front wheels 15L, 15R linked with the rack shaft 30 via the tie rods 18 and the carriers is changed.

When the steering angle of the steering wheel 53 in the counterclockwise direction is at the maximum steering angle, as shown in FIG. 3, the rack shaft 30 is positioned at the left side movement limit position. At this time, the large diameter portion 35 (the screw groove 36) of the rack shaft 30 is positioned on the left side with respect to the right side portion 25 (the first inner peripheral portion 26) of the housing 21.

When a rotational position of the steering wheel 53 is at a more clockwise direction position than the maximum steering angle in the counterclockwise direction, a portion of the large diameter portion 35 (the screw groove 36) is positioned on the inner peripheral side of the right side portion 25 (the first inner peripheral portion 26).

Furthermore, when the steering angle of the steering wheel 53 in the clockwise direction is at the maximum steering angle, as shown in FIG. 4, the rack shaft 30 is positioned at the right side movement limit position. At this time, an approximate right half portion of the screw groove 36 of the rack shaft 30 is positioned on the inner peripheral side of the right side portion 25 (the first inner peripheral portion 26).

Additionally, as shown in FIG. 1, a steering torque sensor 55 for detecting a steering torque (a rotational torque) of the pinion shaft 50 is mounted on the housing 21. As shown in FIG. 1, the steering torque sensor 55 is connected to the control device 60.

Then, an operation of the steering apparatus 20 having the structure described above and an operation of the vehicle 10 along with this operation of the steering apparatus 20 will be described.

When the driver riding in the vehicle 10 rotates the steering wheel 53 in one direction by his/her hand, the pinion shaft 50 rotates and the rack shaft 30 moves in one of the lateral direction with respect to the housing 21. Therefore, the steering angles of the front wheels 15L, 15R linked with the rack shaft 30 via the tie rods 18 and the carriers are changed.

Further, when the pinion shaft 50 is rotated, the steering torque sensor 55 detects a rotation operation torque (steering torque) of the pinion shaft 50, and sends the detected value to the control device 60. Then, the control device 60 calculates a target steering assist torque in accordance with the received rotation operation torque, and operates the electric motor 44 so that the target steering assist torque is obtained.

Then, since the rotation output shaft of the electric motor 44 and the driving pulley are rotated, and thereby the belt meshed with the driving pulley rotates (circulates). Then, since a rotative force of the belt is transmitted to the rotary nut 41 via the driven pulley, the rotary nut 41 is relatively rotated with respect to the rack shaft 30, and thereby a rotative force of the rotary nut 41 (the screw groove 42) is transferred to the rack shaft 30 (the screw groove 36) via the balls 43. Namely, the rotative force of the rotary nut 41 is transmitted to the rack shaft 30 as an assist force for sliding the rack shaft 30, which has been slid by the steering wheel 53 in one direction, in this one direction. Thus, the driver can slide the rack shaft 30 so that steering angles of the front wheels 15L, 15R are at desired steering angles without applying a large force to the steering wheel 53.

In addition, the first seal member 45, which is one of the two seal members sealing between the housing 21 and the rack shaft 30, is fixed to the first outer peripheral portion 33 of the rack shaft 30, while the second seal member 47, which is the other of the two seal members, is fixed to the second inner peripheral portion 27 of the housing 21. Further, along with the movement of the rack shaft 30 in the lateral direction with respect to the housing 21, the first seal member 45 slides on the first inner peripheral portion 26 of the housing 21, while the second seal member 47 slides on the second outer peripheral portion 37 of the rack shaft 30.

In this way, only a cylindrical surface (the second outer peripheral portion 37), on which one of the two seal members (the second seal member 47) slides, is formed on the rack shaft 30, while another cylindrical surface (the first inner peripheral portion 26), on which the other of the two seal members (the first seal member 45) slides, is formed on the housing 21. In other words, the rack tooth portion 32, the screw groove 36 and the second outer peripheral portion 37 on which the second seal member 47 slides are formed on the outer peripheral surface of the rack shaft 30, and the first inner peripheral portion 26, on which the first seal member 45 slides, is not formed on the outer peripheral surface of the rack shaft 30. Additionally, since the same length as the length of the first seal member 45 in lateral direction is sufficient for the first outer peripheral portion 33 (namely, it is not necessary for the first outer peripheral portion 33 to have a length larger than the length of the first seal member 45 in lateral direction.), it is possible to make the first outer peripheral portion 33 have a short lateral length. Namely, there is no problem even if the lateral length of the first outer peripheral portion 33 is short.

Therefore, even when the entire length (the lateral length) of the rack shaft 30 is short, the rack tooth portion 32, the screw groove 36 and the second outer peripheral portion 37 on which the second seal member 47 slides can be formed on the rack shaft 30 with an entire length of each of the rack tooth portion 32, the screw groove 36 and the second outer peripheral portion 37 being long.

Therefore, a fear that water coming into the housing 21 from the left and right open ends thereof heads to the ball screw nut 40 side is low even when the entire length of the rack shaft 30 is short and the maximum steering angles of the front wheels 15L, 15R are set to be large (namely, even when the slidable distance of the rack shaft 30 in the lateral direction is long). Thus, there is a low possibility that the grease applied to the ball screw nut 40 is washed away by the water, and thereby motion of the ball screw nut 40 becomes unsmooth, and/or durability of the ball screw nut 40 decreases.

In addition, it is possible to set the maximum steering angles of the front wheels 15L, 15R to be large and fix the second seal member 47 to the second outer peripheral portion 37 of the rack shaft 30 (and the first seal member 45 is fixed to the first inner peripheral portion 26 of the housing 21). In this case, since it is necessary to form the second inner peripheral portion 27, with which the second seal member 47 is in contact, so as to be long, the entire length of the housing 21 must be long.

However, in general, in the vehicle 10 a variety of members are provided around the housing 21. Therefore, there is a case where the entire length of the housing 21 must be short in order to avoid interference between these members and the housing 21. However, in the case where the entire length of the housing 21 is short, however, there is a fear that the second seal member 47 comes out of the housing 21 from the left end of the housing 21 when the steering angles of the front wheel 15L, 15R in the counter-clockwise direction are at the maximum steering angles. In other words, when the steering angles of the front wheel 15L, 15R in the counter-clockwise direction are at the maximum steering angles, there is a fear that the second seal member 47 does not contact with the second inner peripheral portion 27 of the housing 21, and thereby water heads to the ball screw nut 40 after passing through an annular space between the second inner peripheral portion 27 and the rack shaft 30.

However, in the case where the second seal member 47 is fixed to the second inner peripheral portion 27 of the housing 21 as the steering apparatus 20 according to this embodiment, the second inner peripheral portion 27, to which the second seal member 47 is fixed, does not needs to be formed so as to be long even when the maximum steering angles of the front wheels 15L, 15R are set to be large. Therefore, even when the entire length of the housing 21 is short and the maximum steering angles of the front wheels 15L, 15R are set to be large (namely, even when the slidable distance of the rack shaft 30 in the lateral direction is long), it is possible to bring the second seal member 47 into contact with the second outer peripheral portion 37 of the rack shaft 30 at all time.

Therefore, there is a low possibility that water heads to the ball screw nut 40 after passing through a gap formed between the second seal member 47 and the second outer peripheral portion 37 of the rack shaft 30 when the steering angles of the front wheels 15L, 15R are at the maximum steering angles.

Figure 5:
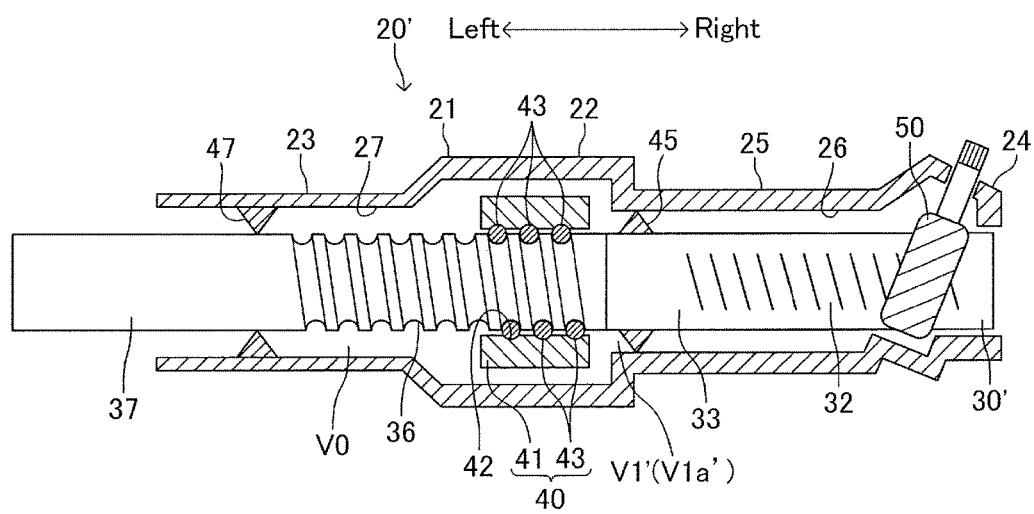
FIG. 5 is a longitudinal sectional view of a steering apparatus according to a comparative example, in which an outer diameter of the whole rack shaft is substantially constant, when the rack shaft moves at the left side movement limit position.
Figure 6:
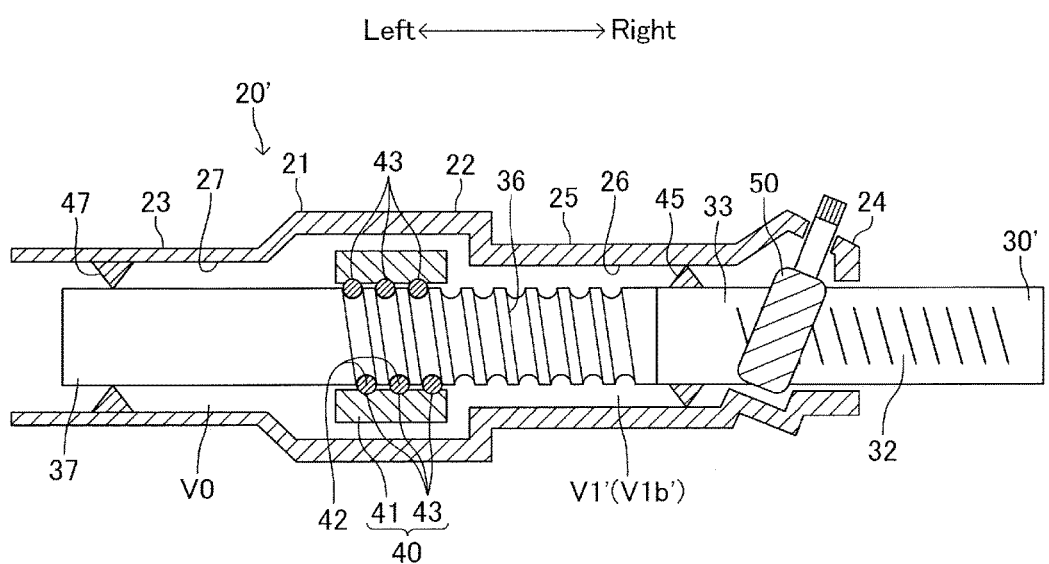
FIG. 6 is a longitudinal sectional view similar to that of FIG. 5 when the rack shaft of the comparative example moves at the right side movement limit position.
Figure 7:
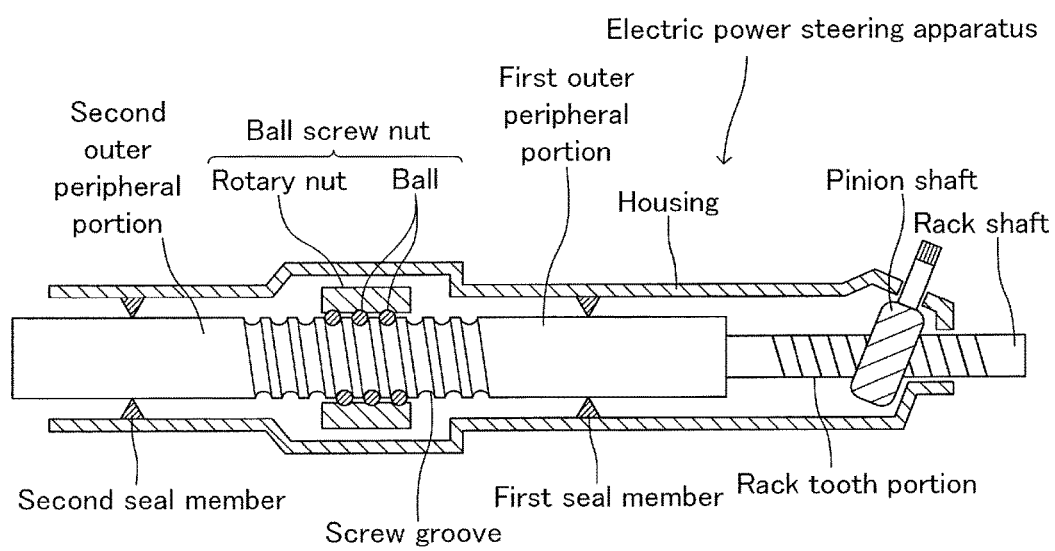
FIG. 7 is a longitudinal sectional view similar to that of FIG. 2, which shows a steering apparatus according to a conventional example where two seal members are fixed to an inner peripheral surface of a housing.

Further, FIGS. 5 and 6 show a steering apparatus 20' according to a comparative embodiment. In this steering apparatus 20', the outer diameter of the rack shaft 30' is substantially constant over the entire length thereof. In other words, the rack shaft 30' does not have configurations corresponding to the small diameter portion 31 and the large diameter portion 35 of the rack shaft 30.

In the steering apparatus 20, the first inner peripheral portion 26 has a special portion, that is positioned between the left end thereof and a portion (position) thereof with which the first seal member 45 contacts. In the steering apparatus 20, a volume V1 of an annular space formed between the special portion and the rack shaft 30 is changed depending on the relative position of the rack shaft 30 with respect to the housing 21. Similarly, in this steering apparatus 20', the first inner peripheral portion 26 has a special portion, that is positioned between the left end thereof and a portion (position) thereof with which the first seal member 45 contacts. In this steering apparatus 20', a volume V1' of an annular space formed between the special portion and the rack shaft 30 is changed depending on the relative position of the rack shaft 30 with respect to the housing 21. On the other hand, in both of the steering apparatus 20 and this steering apparatus 20', a volume V0 of an annular space formed between a portion of the inner peripheral surface of the housing 21, that is positioned between the left end of the first inner peripheral portion 26 and the second seal member 47, and the rack shaft 30 is constant (namely, it is not changed), even when the relative positions of the rack shafts 30, 30' with respect to the housing 21 is changed.

FIG. 5 shows a state where the rack shaft 30' of the steering apparatus 20' is at the left side movement limit position. FIG. 6 shows a state where the rack shaft 30' of the steering apparatus 20' is at the right side movement limit position.

A volume V1' of the steering apparatus 20' of FIG. 5 is the minimum value V1a', and the volume V1' of the steering apparatus 20' of FIG. 6 is the maximum value V1b'. The change amount between FIG. 5 and FIG. 6 is ∠V1' (=V1b'−V1a').

The outer diameter of the rack shaft 30' is substantially constant over its entire length thereof. In other words, the outer diameter of the portion of the rack shaft 30', on which the screw groove 36 is formed, is not larger than that of the portion of the rack shaft 30', on which the first outer peripheral portion 33 is formed. Therefore, a cross-sectional area A' of an annular space formed between the first inner peripheral portion 26 and the rack shaft 30' (the first outer peripheral portion 33, the screw groove 36) of the steering apparatus 20' is large. Thus, the change amount ∠V1' of the volume V1' between FIG. 5 and FIG. 6 is large. Therefore, when the rack shaft 30' moves between the left and right movement limit positions, a change ratio of the volume of the annular space (the space between seal members) formed among the first seal member 45, the second seal member 47, the housing 21 and the rack shaft 30' (=∠V1'/(V0+V1a')) is large. In other words, a change ratio of air pressure in the space between seal members becomes large.

If air pressure in the space between seal members sharply decreases when the rack shaft 30' slides, air and/or water outside of the first seal member 45 and the second seal member 47 are easily sucked into the space between seal members via a space between the first seal member 45 and the first inner peripheral portion 26 and a space between the second seal member 47 and the second outer peripheral portion 37. Namely, the fear that the water washes away the grease applied to the ball screw nut 40 becomes large.

On the other hand, in the steering apparatus 20 of the present embodiment, the outer diameter of the large diameter portion 35, that is a portion of the rack shaft 30 on which the screw groove 36 is formed, is larger than that of the small diameter portion 31, that is a portion of the rack shaft 30 on which the rack tooth portion 32 is formed. Therefore, when the rack shaft 30 moves between the left movement limit position (FIG. 3) and the right movement limit position (FIG. 4), a cross-sectional area A of an annular space formed between the first inner peripheral portion 26 and the rack shaft 30 (the large diameter portion 35) of the steering apparatus 20 is smaller than the cross-sectional area A'. Thus, a change amount ∠V1 of the volume V1 between FIG. 3 and FIG. 4 is smaller than the change amount ∠V1' Therefore, when the rack shaft 30 moves between the left and right movement limit positions, a change ratio of the volume of the space between seal members (=∠V1/(V0+V1a)) is smaller than that of the steering apparatus 20'. Noted that, V1 of FIG. 3 is V1a. Thus, a change ratio of air pressure in the space between seal members of the steering apparatus 20 is smaller than that of the steering apparatus 20'.

Therefore, when the rack shaft 30 slides in a direction in which the air pressure of the space between seal members of the steering apparatus 20 is decreased, air and/or water outside of the first seal member 45 and the second seal member 47 are hardly sucked into the space between seal members via a space between the first seal member 45 and the first inner peripheral portion 26 and a space between the second seal member 47 and the second outer peripheral portion 37. Namely, the fear that the water washes away the grease applied to the ball screw nut 40 is small.

Moreover, the large diameter cylindrical portion 22 having the inner diameter larger than that of a portion adjacent to the large diameter cylindrical portion 22 is formed on a portion of the housing 21 of the steering apparatus 20, which is positioned between the first seal member 45 and the second seal member 47. In other words, the volume V0 of the annular space formed between the portion of the inner peripheral portion of the housing 21, that is positioned between the left end of the first inner peripheral portion 26 and the second seal member 47, and the rack shaft 30 is larger compared with the case where the large diameter cylindrical portion 22 is not formed in the housing 21.

Therefore, when the rack shaft 30 of the steering apparatus 20 moves between the left and right movement limit positions, the change ratio of the volume of the space between seal members (=∠V1/(V0+V1a)) is smaller compared with the case where the large diameter cylindrical portion 22 is not formed in the housing 21.

Therefore, in this steering apparatus 20, it is more hard for air and/or water to be sucked into the space between seal members via the space between the first seal member 45 and the first inner peripheral portion 26 and the space between the second seal member 47 and the second outer peripheral portion 37 compared with the case where the large diameter cylindrical portion 22 is not formed in the housing 21.

In addition, it is necessary to make the housing 21 have a large diameter in order to install the ball screw nut 40 in the housing 21. On the other hand, when making the entire housing 21 have a large diameter, freedom of a layout of the members provided around the housing 21 is restricted.

However, in the housing 21 of this embodiment, the diameter of the large diameter cylindrical portion 22, that is a portion in which the ball screw nut 40 is installed, is large, while the diameters of the left side portion 23 and the right side portion 25, which are adjacent to the large diameter cylindrical portion 22, are small.

Therefore, it is possible to install the ball screw to nut 40 in the housing 21 while suppressing restriction to freedom of a layout of the members provided around the housing 21.

Although the present invention has been described with reference to the above embodiments, the present invention is not limited to the above embodiments, and various modifications can be made without departing from an object of the present invention.

For example, a first seal member (which has the same structure as the second seal member 47 of the above embodiment) fixed to the first inner peripheral portion 26 of the housing 21 may slidably contact with the first outer peripheral portion 33 of the rack shaft 30, and a second seal member (which has the same structure as the first seal member 45 of the above embodiment) fixed to the second outer peripheral portion 37 of the rack shaft 30 may slidably contact with the second inner peripheral portion 27 of the housing 21.

A portion corresponding to the right end portion 24, the first inner peripheral portion 26, the large diameter cylindrical portion 22 and the second inner peripheral portion 27 may be formed in the housing 21 in that order from the left side, and the rack tooth portion 32, the first outer peripheral portion 33, the screw groove 36 and the second outer peripheral portion 37 may be formed in the rack shaft 30 in that order from the left side.

Without providing the small diameter portion 31 and the large diameter portion 35 in the rack shaft 30, the outer diameter of the rack shaft 30 may be substantially constant over the entire length thereof.

What is claimed is:

1. A steering apparatus comprising:
   a cylindrical housing extending in a lateral direction which is a vehicle body width direction;
   a rack shaft inserted into said housing so as not to be rotatable about an axis thereof, said rack shaft changing a steering angle of a wheel by sliding in said axial direction, said rack shaft provided at two positions different from each other in said axial direction with a rack tooth portion and a screw groove respectively;
   a pinion shaft sliding said rack shaft by transmitting a torque of a steering wheel to said rack tooth portion;
   a ball screw nut, provided inside said housing, for sliding said rack shaft by transmitting a torque of an electric motor to said screw groove;
   a first seal member fixed to one of an outer peripheral surface of said rack shaft and an inner peripheral surface of said housing so as to be positioned on said rack tooth portion side with respect to said screw groove, said first seal member slidably contactingwith a cylindrical surface which is centered on said axis and is provided on the other of said outer peripheral surface of said rack shaft and said inner peripheral surface of said housing; and
   a second seal member fixed to the other of said outer peripheral surface of said rack shaft and said inner peripheral surface of said housing so as to be positioned on a side opposite to said rack tooth portion with respect to said screw groove, said second seal member slidably contacting with a cylindrical surface which is centered on said axis and is provided on the one of said outer peripheral surface of said rack shaft and said inner peripheral surface of said housing, wherein,
   said first seal member is fixed to a first outer peripheral portion which is formed on said outer peripheral surface of said rack shaft so as to be at a position between said rack tooth portion and said screw groove, and slidably contacts with a first inner peripheral portion which is said cylindrical surface of said housing, and
   said second seal member is fixed to a second inner peripheral portion which is formed on said inner peripheral surface of said housing so as tri be at a position different from said first said cylindrical surface formed on said outer peripheral surface of said rack shaft so as to be positioned on a side opposite to said rack tooth portion with respect to said screw groove.

2. A steering apparatus according to claim 1, wherein,
   said rack shaft is provided with a large diameter portion, on which said screw groove is formed, and a small diameter portion, which has said first outer peripheral portion and a diameter smaller than that of said large diameter portion,
   an outer diameter of said first seal member is larger than that of said large diameter portion,
   when a relative position of said rack shaft with respect to said housing is a predetermined position, said large diameter portion faces with said first inner peripheral portion from inner peripheral side of said housing.

3. A steering apparatus according to claim 1, wherein,
   a portion of said housing is constituted by a large diameter cylindrical portion, which is positioned between said first seal member and said second seal member and has a diameter larger than that of a portion adjacent to said large diameter cylindrical portion.

4. A steering apparatus according to claim 3, wherein,
   said ball screw nut is provided inside said large diameter cylindrical portion.

* * * * *